United States Patent
El-Wardany et al.

(10) Patent No.: US 12,291,784 B2
(45) Date of Patent: May 6, 2025

(54) CORROSION PROTECTION USING METALLIC COATING

(71) Applicant: Goodrich Corporation, Charlotte, NC (US)

(72) Inventors: Tahany El-Wardany, Vernon, CT (US); Kenneth D. Smith, East Longmeadow, MA (US); Tianli Zhu, Glastonbury, CT (US); Weilong Zhang, Glastonbury, CT (US); Sergey Mironets, Philadelphia, PA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/962,367

(22) Filed: Oct. 7, 2022

(65) Prior Publication Data

US 2024/0117497 A1    Apr. 11, 2024

(51) Int. Cl.
  C23C 26/00    (2006.01)
  B33Y 10/00    (2015.01)
  B33Y 50/02    (2015.01)

(52) U.S. Cl.
  CPC .............. *C23C 26/00* (2013.01); *B33Y 10/00* (2014.12); *B33Y 50/02* (2014.12)

(58) Field of Classification Search
  CPC ...... B23K 20/1215; C23C 26/00; B33Y 10/00
  See application file for complete search history.

(56) References Cited

U.S. PATENT DOCUMENTS

| | | | | |
|---|---|---|---|---|
| 4,930,675 | A * | 6/1990 | Bedford | B23K 35/327 |
| | | | | 228/114.5 |
| 6,457,629 | B1 * | 10/2002 | White | B23K 20/103 |
| | | | | 228/114.5 |
| 8,603,571 | B2 * | 12/2013 | Carlson | C23C 26/00 |
| | | | | 427/11 |
| 10,450,636 | B2 | 10/2019 | Watson et al. | |
| 10,525,529 | B2 * | 1/2020 | Stoyanov | C23C 24/04 |
| 10,688,588 | B2 * | 6/2020 | Twelves, Jr. | B33Y 10/00 |
| 2017/0361406 | A1 | 12/2017 | Grigorenko | |
| 2018/0311713 | A1 * | 11/2018 | Joshi | B21C 23/08 |
| 2020/0306869 | A1 * | 10/2020 | Hardwick | B23K 20/1215 |
| 2021/0205916 | A1 | 7/2021 | Senderos et al. | |
| 2021/0402471 | A1 | 12/2021 | Whalen et al. | |
| 2022/0002844 | A1 | 1/2022 | Härtel | |

FOREIGN PATENT DOCUMENTS

CN    102187049    9/2011

OTHER PUBLICATIONS

European Patent Office, European Search Report dated Feb. 29, 2024 in Application No. 23201013.2.

* cited by examiner

*Primary Examiner* — Michael P Wieczorek
(74) *Attorney, Agent, or Firm* — SNELL & WILMER L.L.P.

(57) ABSTRACT

A method of forming a metallic coating a workpiece is disclosed herein. The method includes receiving a sacrificial deposition rod formed of a first material, receiving a workpiece of a second material, forming a coating of the first material from the sacrificial deposition rod onto the workpiece, the coating having a first thickness, and machining the coating to a second thickness that is less than the first thickness.

12 Claims, 8 Drawing Sheets

CORROSION PROTECTION USING METALLIC COATING

FIELD

The present disclosure generally relates to metal and metal alloy coatings and more specifically to applying a metal or metal alloy coating.

BACKGROUND

During manufacture of a part or component, a coating may be formed over a surface of the part or component. The coating may be formed from various different materials such as polymers or metals. Sometimes, a coating formed from a specific metal is used to improve the performance of a part made from a different metal.

SUMMARY

A method of coating a workpiece is disclosed herein. The method includes receiving a sacrificial deposition rod formed of a first material, receiving a workpiece of a second material, forming a metallic coating of the first material from the deposition rod onto the workpiece, the coating having a first thickness, and machining the coating to a second thickness that is less than the first thickness.

In various embodiments, the first material is a metal alloy having a high corrosion resistance. In various embodiments, the method further includes forming the sacrificial deposition rod using a shear assisted processing and extrusion process (ShAPE™), where the metal alloy of the first material is an icosahedral phase (I-phase) Al alloy. In various embodiments, the second material is different than the first metal. In various embodiments, the second material is the same as the first material. In various embodiments, the forming the coating further includes performing a first deposition process to form a first layer over the workpiece and performing a second deposition process to form a second layer over the first layer.

In various embodiments, the first layer is formed to a third thickness and the second layer is formed to a fourth thickness. In various embodiments, the first deposition process is a Friction Surface Additive Manufacturing process. In various embodiments, the forming the coating further includes placing the workpiece in a milling machine, setting the sacrificial deposition rod in a chuck of the milling machine, the deposition rod contacting the workpiece, and modifying the milling machine to spin the deposition rod at a first rotation per minute, feed the deposition rod in an axial direction at a first speed, and feed the deposition rod in a radial direction at a second speed.

Also disclosed herein is a system including a workpiece, a milling machine configured to receive the workpiece, a deposition rod coupled to the milling machine, a processor, and a memory operatively coupled to the processor. The memory includes instructions stored thereon that, when executed by the processor, cause the processor determine a first number of rotations per minute (RPM), determine a first axial feed rate, determine a first radial feed rate, send instructions to the milling machine to rotate the deposition rod at the determined first number of RPM, feed the deposition rod in an axial direction at the first axial feed rate, and move the deposition rod in a radial direction at the first radial feed rate to form a coating over the workpiece surfaces.

In various embodiments, the instructions, when executed by the processor, further cause the processor to receive an input indicating a type of material used in the deposition rod and determine the first number of RPMs, the first axial feed rate, and the first radial feed rate based at least in part on the type of material used in the deposition rod. In various embodiments, the instructions, when executed by the processor, further cause the processor to receive an input indicating a final thickness of the coating on the workpiece and send instructions to the milling machine to machine the coated layers to the final thickness. In various embodiments, the instructions, when executed by the processor, further cause the processor to receive an input indicating a layer thickness of a layer of the coating on the workpiece and send instructions to the milling machine to deposit the coating having the layer thickness.

In various embodiments, the instructions, when executed by the processor, further cause the processor to send instructions to the milling machine to deposit a number of layers of material to form the coating on the workpiece, a thickness of each layer of the number of layers being the layer thickness, a resulting thickness being greater than the final thickness. In various embodiments, the deposition rod is formed of an icosahedral phase (I-phase) Al alloy. In various embodiments, the instructions, when executed by the processor, further cause the processor to receive an input indicating a diameter of the deposition rod and adjust the first number of RPM based on the diameter of the deposition rod.

Also disclosed herein is a method of forming a coating over a metal workpiece. The method includes receiving a deposition rod of a first material, rotating the deposition rod at a first rotation per minute (RPM), applying a first force in a first direction, the first direction being orthogonal to a surface of the metal workpiece, and applying a second force in a second direction, the second direction being parallel to the surface of the metal workpiece.

In various embodiments, the method further includes determining at least one of the first RPM, the first force, and the second force based on at least a diameter of the deposition rod. In various embodiments, the method further includes determining at least one of the first RPM, the first force, and the second force based on at least the first material. In various embodiments, the first material is an icosahedral phase (I-phase) Al alloy.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
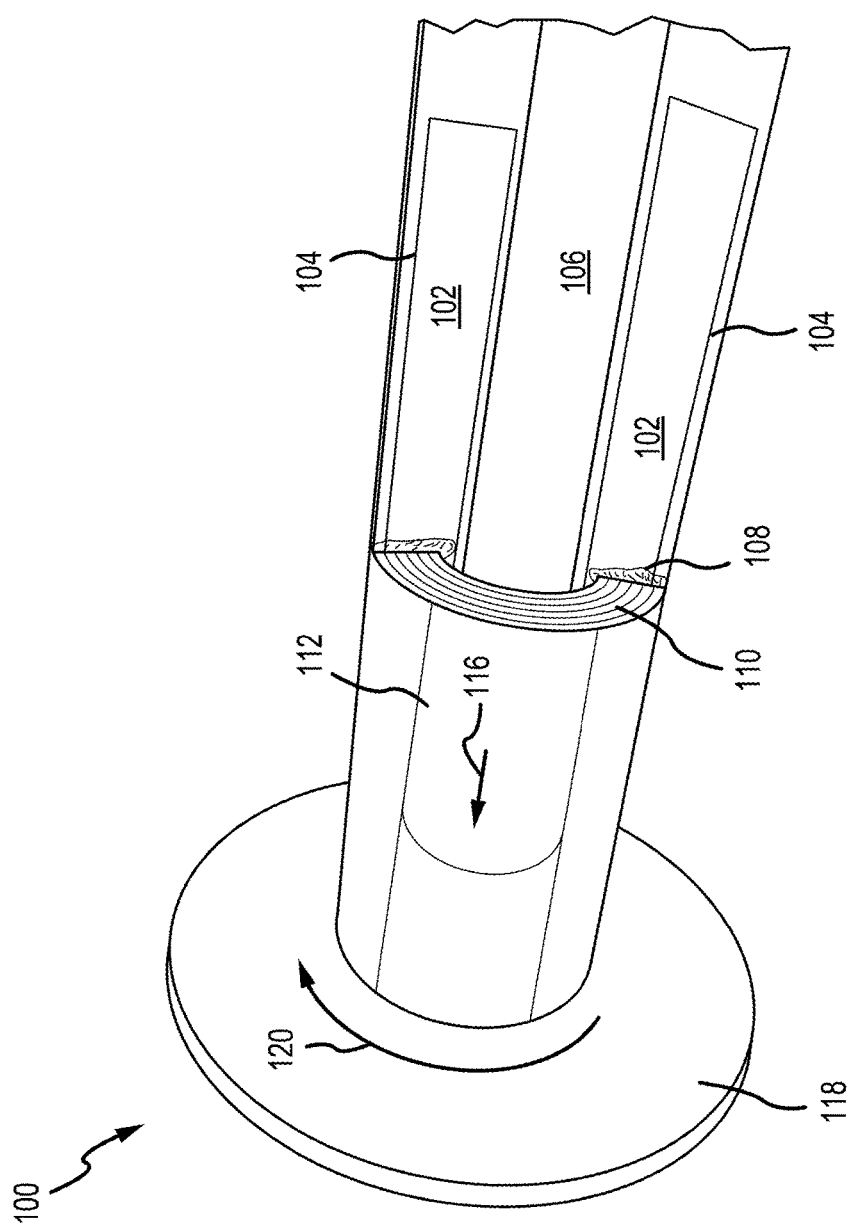
FIG. 1 illustrates formation of a sacrificial deposition rod from metal powder, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a method of forming a coating consisting of a metal or metal alloy over a part or component. In various embodiments, the coating may be made from a metal alloy having a high corrosion resistance. In various embodiments, the metal alloy may be an icosahedral phase (I-phase) metal alloy, such as for example, an I-phase aluminum (Al) alloy. In various embodiments, I-phase Al alloy may be one of the alloys described in U.S. Pat. No. 10,450,636 entitled "Aluminum alloys and manufacture methods," which is incorporated herein by reference. In various embodiments, the method includes providing a metal powder or metal alloy powder as feed stock. In various embodiments, the method includes forming the metal powder or metal alloy powder into a sacrificial deposition rod, or rod. In various embodiments, a solid phase processing method utilizing a high shear strain, such as, for example, Shear Assisted Processing & Extrusion (ShAPE™) technology, may be used to produce the sacrificial deposition rod having a uniformly controlled microstructure with a refined grain size while being cost effective. Using ShAPE™ technology reduces the cost to form the sacrificial deposition rod. In various embodiments, a milling machine may be used to apply the coating from the sacrificial deposition rod to the part. In various embodiments, the milling machine may be a 3-axis milling machine. In various embodiments, the milling machine may be a 5-axis milling machine. In various embodiments, the milling machine may control rotations per minute (RPM), axial feed rate, and radial feed rate of the sacrificial deposition rod to form the coating. In various embodiments, a friction surface additive manufacturing (F SAM) process may be used. In various embodiments, the FSAM process may include additively manufacturing a workpiece by applying friction between a sacrificial deposition rod and the workpiece. In various embodiments, the friction may be applied by rotating or translating the sacrificial deposition rod with respect to the workpiece.

In various embodiments, the method includes machining the coated layer to a desired thickness. In various embodiments, the sacrificial deposition rod is formed from a metal alloy having a high corrosion rate. In various embodiments, the metal alloy may be formed from a classic group of nanocomposite powder particles of aluminum with dispersed icosahedral quasicrystals based on quinternary Al—Cr—Co—Mn—Zr alloy. In various embodiments, the metal alloy is an I-phase Al alloy powder. The metal alloy sacrificial deposition rod is used to form a coating over a structural alloy (e.g., Al, Steel, Mg, and/or alloys thereof, etc.). Using a metal alloy having a high corrosion strength (e.g., I-phase Al alloy, Al—Cr—Co—Mn—Zr alloy, etc.) to form a coating may reduce corrosion maintenance and/or improve performance of the coated surface. Furthermore, by using a high corrosion strength metal alloy (e.g., I-phase Al alloy) to form the coating, the grain structure of the sacrificial deposition rod is less important than using a corrosion strength metal alloy for the part or material. Accordingly, there is a cost reduction in manufacturing the part having a coating as compared to manufacturing the part without the coating.

Referring now to FIG. 1, a consolidation process 100 of a sacrificial deposition rod is illustrated, in accordance with various embodiments. The sacrificial deposition rod, also referred to as a sacrificial bar or rod, formed by consolidation process 100 may be used to form a protective coating, or layer, over a workpiece. The sacrificial deposition rod is formed from a powder 102, also referred to as flake, scrap, or billet. In various embodiments, powder 102 may be a metal powder formed from one or more metal alloys. In various embodiments, powder 102 may be an icosahedral phase (I-phase) Al alloy. In various embodiments, the I-phase Al alloy may be atomized into a powder. In various embodiments powder 102 is placed in a billet container 104 that is disposed around a mandrel 106. Powder 102 in billet container 104 may then be heated by a heating element 108. As powder 102 is heated, powder 102 passes through spiral grooves 110 in an extruding tube 112. The heated powder 102 is then pressed to form a billet inside extrusion tube 112. After forming the billet, the mandrel 106 extrudes the billet through extrusion tube 112 in the direction of arrow 116 toward a die 118. As the billet forms into an extrusion as it moves through the extrusion tube toward die 118 in the direction of arrow 116. The sacrificial deposition rod is formed as die 118 rotates in a direction indicated by arrow 120. In various embodiments, consolidation process 100 may be a Shear Assisted Processing and Extrusion (ShAPE™) process that was developed by Pacific Northwest National Laboratory. This process, when used with I-phase Al alloy, produces the sacrificial deposition rod faster and cheaper than other consolidation processes.

Figure 2:
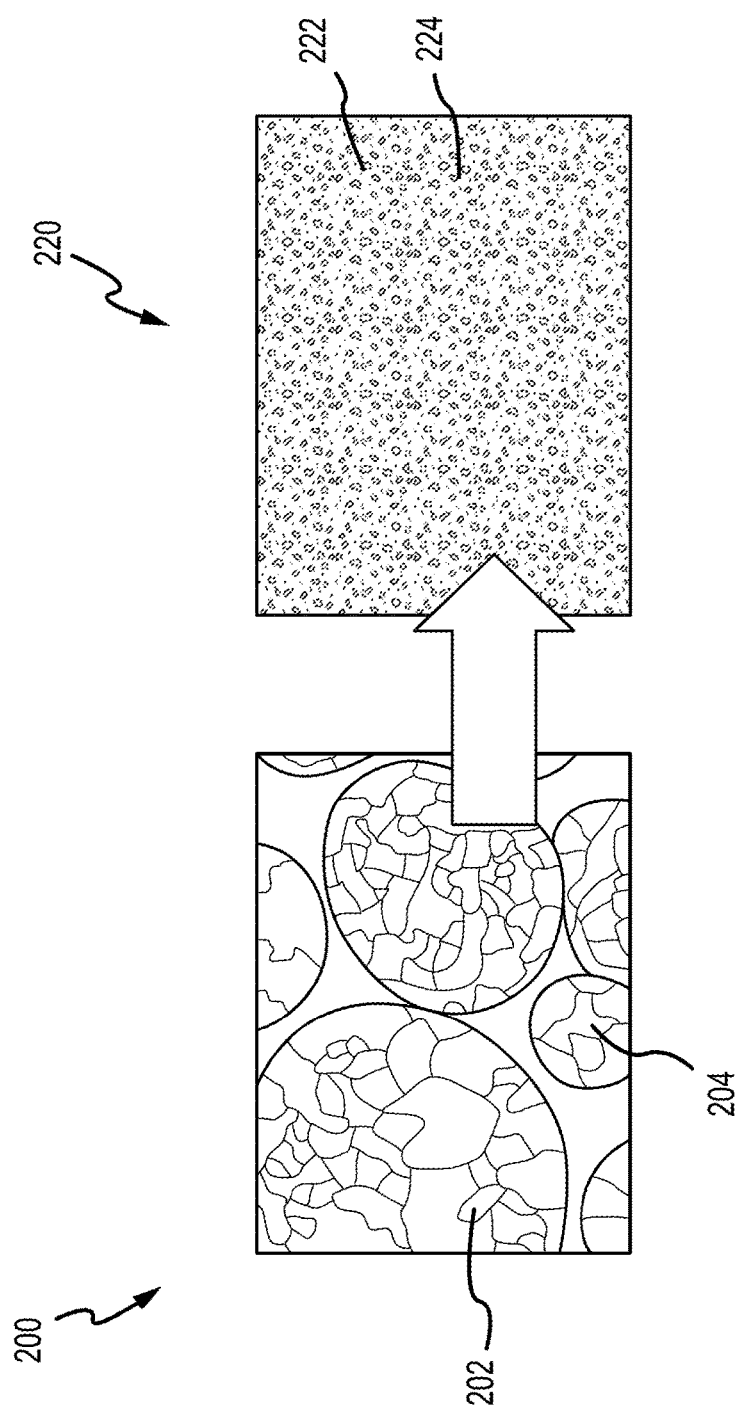
FIG. 2 illustrates metal powder composition before and after formation of a sacrificial deposition rod, in accordance with various embodiments.

Referring now to FIG. 2, an atomized I-phase Al alloy powder image 200 and a post processing I-phase Al alloy image 220 are illustrated, in accordance with various embodiments. Images 200 and 220 are taken at a scale of 30 μm. As illustrated in FIG. 2, atomized I-phase Al alloy image 200 depicts particles 202 and 204 and post processing I-phase Al alloy image 220 depicts particle 222 and 224 at the same scale as image 200. While particle 202 is larger than particle 204, it can be seen that particles 202 and 204 are orders of magnitude larger than particles 222 and 224 after forming sacrificial deposition rod using process 100, as described above with respect to FIG. 1.

Figure 3:
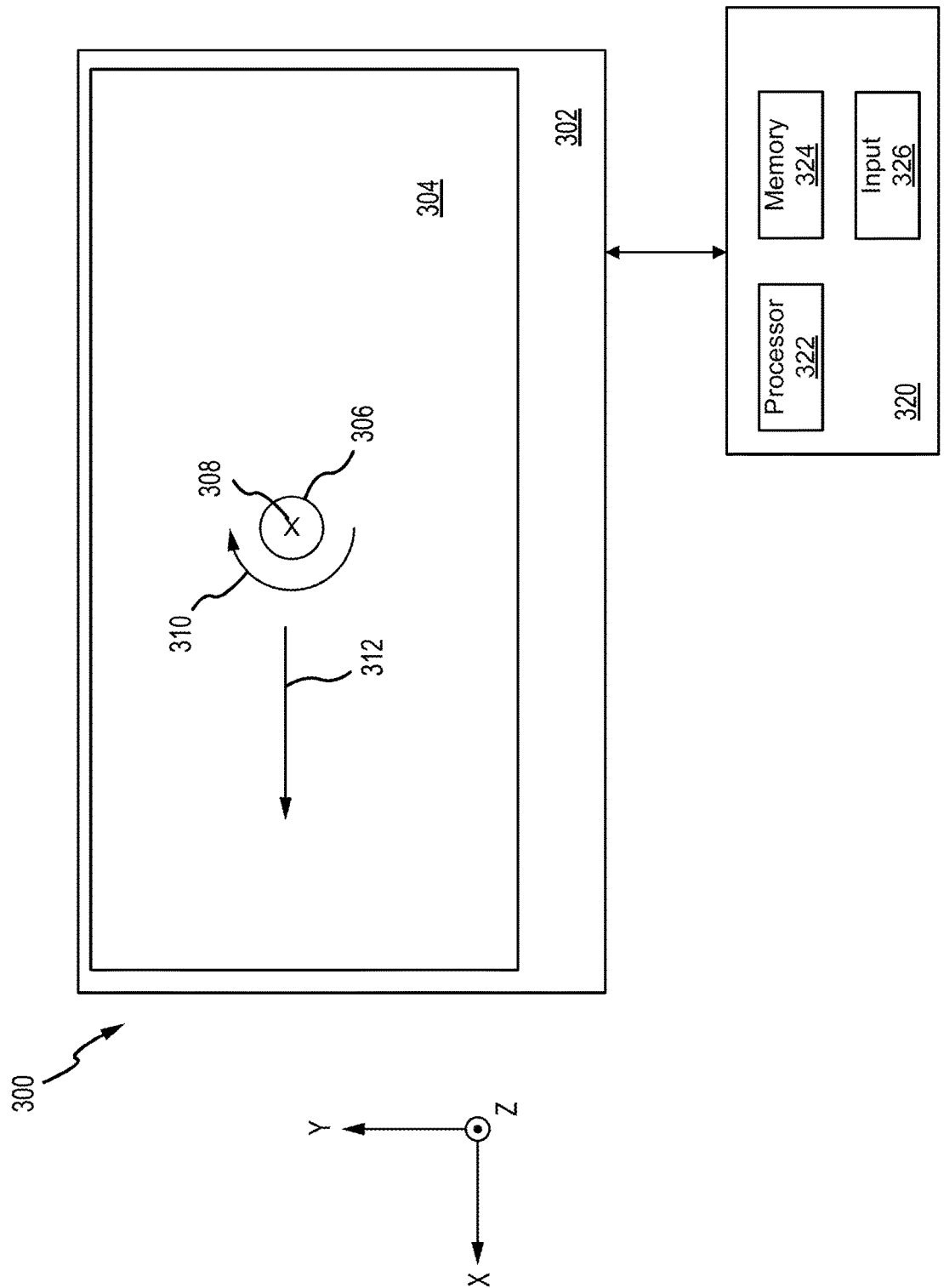
FIG. 3 illustrates a system for coating a workpiece, in accordance with various embodiments.

Referring now to FIG. 3, a system 300 for forming a coating over a workpiece is illustrated, in accordance with various embodiments. System 300 includes a milling machine 302 that is configured to receive a workpiece 304 and a sacrificial deposition rod 306. In various embodiments, workpiece 304 may be a metal plate. In various embodiments, workpiece 304 may be curved or bowed. In various embodiments, workpiece 304 may be for use with an aircraft or other vehicle. In various embodiments, sacrificial deposition rod 306 may be formed as described above with respect to FIG. 1. In various embodiments, sacrificial deposition rod 306 may be formed by another process. In various embodiments, sacrificial deposition rod may be made from a metal alloy. In various embodiments, the metal alloy may be an I-phase Al alloy. In various embodiments, milling machine 302 may be a 3-axis milling machine. In various embodiments, milling machine 302 may be a 5-axis milling machine.

Milling machine 302 may be configured to move sacrificial deposition rod 306 in at least 3-axis (e.g., X, Y, Z) with respect to workpiece 304. Milling machine 302 may further be configured to rotate sacrificial deposition rod 306 with respect to workpiece 304. System 300 forms a coating over workpiece 304 through friction. The coating may be formed of a single deposition layer or of multiple deposition layers. Each deposition layer may have the same thickness or a different thickness. After depositing the coating, milling machine 302 may be used to machine the coating to a desired thickness. That is, the coating may ground, sanded, or otherwise machined to smooth, polish, and/or decrease the thickness of the coating.

Milling machine 302 rotates sacrificial deposition rod 306 and moves sacrificial deposition rod 306 in an axial direction (e.g., the z-axis) and a radial direction (e.g., the x-axis). The rotation and movement of sacrificial deposition rod 306 generates friction causing the material of sacrificial deposition rod 306 to stick to workpiece 304, thereby forming a coating on workpiece 304. Milling machine moves sacrificial deposition rod 306 downward (e.g., in the negative z-direction as indicated by marker 308) in an axial direction (e.g., along the axis of sacrificial deposition rod 306). Milling machine also rotates sacrificial deposition rod 306 as indicated by arrow 310 (e.g., clockwise) about a center axis of deposition bar. In various embodiments, milling machine 302 may rotate sacrificial deposition rod 306 counterclockwise. Additionally, milling machine 302 may move sacrificial deposition rod 306 in a radial direction (e.g., the x-direction as indicated by arrow 312).

System 300 further includes a controller 320 that is in communication with milling machine 302 and is configured to control milling machine 302. Controller 320 may include one or more processors 322 configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Controller 320 may further include a memory 324 to store data, executable instructions, system program instructions, and/or controller instructions to implement the control logic of controller 320. Memory 324 may further store a database, a look up table, and/or other data objects for use by the executable instructions for implementing the control logic of controller 320. System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Controller 320 may further include an input 326. In various embodiments, input 326 may be a bus or communication protocol with another device. In various embodiments, input 326 may be a touch screen, keyboard, and/or other input device located on milling machine 302. In various embodiments, input 326 may be a network connection for receiving inputs via a network connected device.

Controller 320 is configured to communicate with and control milling machine 302. Controller 320 may send instructions to milling machine 302 to control the working parameters of milling machine 302. In various embodiments, the instructions may be stored in memory 324 as a computer numerical control (CNC) program. The working parameters include the RPM, the axial speed, the axial force, and the radial speed applied to sacrificial deposition rod 306. In various embodiments, the RPM may soften the material of the sacrificial deposition rod 306 allowing material to form a coating on workpiece 304. In various embodiments, the working parameters may be received via input 326. In various embodiments, the working parameters may be derived from input received via input 326. For example, input 326 may receive a type of material of workpiece 304, a type of metal of sacrificial deposition rod 306, and/or a diameter of sacrificial deposition rod 306, among other input information.

In various embodiments, controller 320 may use the input information to determine the working parameters to send to milling machine 302. In various embodiments, controller 320, and more specifically memory 324, may store a database of working parameters for different material types and diameters. For example, controller 320 may send a first set of working parameters to milling machine 302 in response to the input indicating that the sacrificial deposition rod 306 is formed from an I-phase Al alloy having a first diameter. As another example, controller 320 may send a second set of working parameters, with at least one parameter being different, to milling machine 302 in response to the input indicating that the diameter of sacrificial deposition rod 306 is a second diameter that is different than the first diameter.

By adjusting the working parameters (e.g., RPM, axial speed, axial force, radial speed, etc.) for different materials and sized materials, controller 320 and milling machine 302 may deposit coatings having different thicknesses which improves the quality of the workpiece while reducing the cost of the workpiece. For example, I-phase Al alloy has a higher resistance to corrosion than other metal alloys, however, it is also more expensive. By forming workpiece 304 of a first type of metal alloy and coating workpiece 304 with I-phase Al alloy, workpiece benefits from the cost savings of the first type of metal alloy and the corrosion resistance of the coating of I-phase Al alloy. Adjusting the working parameters of milling machine 302 by controller 320 allows for a uniform and consistent coating over workpiece 304. Additionally, each layer of the coating may be controlled to be a precise thickness to avoid material waste associated with forming a thick coating and machining the coating to a thinner, desired, thickness. Sacrificial deposition rod 306 is heated by friction between sacrificial deposition rod 306 and workpiece 304 causing the material of sacrificial deposition rod 306 to adhere to workpiece 304. Additional machining (e.g., grinding, sanding, etc.) may be performed to reduce the layer to the desired thickness.

Referring now to FIGS. 4A-4D, illustrated is a process 400 of forming a coating on a workpiece 402, in accordance with various embodiments. Workpiece 402 may be an example of workpiece 304 described above with respect to FIG. 3. Process 400 may be performed on milling system such system 300 described above. In various embodiments, the coating on workpiece 402 may include a single coating layer. In various embodiment, the coating on workpiece 402 may include more than one coating layer. In various embodiments, each coating layer may be formed from the same material or different materials. Process 400 is described herein as including four coating layers for description purposes. However, it should be understood that process 400 may be used form any number of coating layers.

Figure 4A:
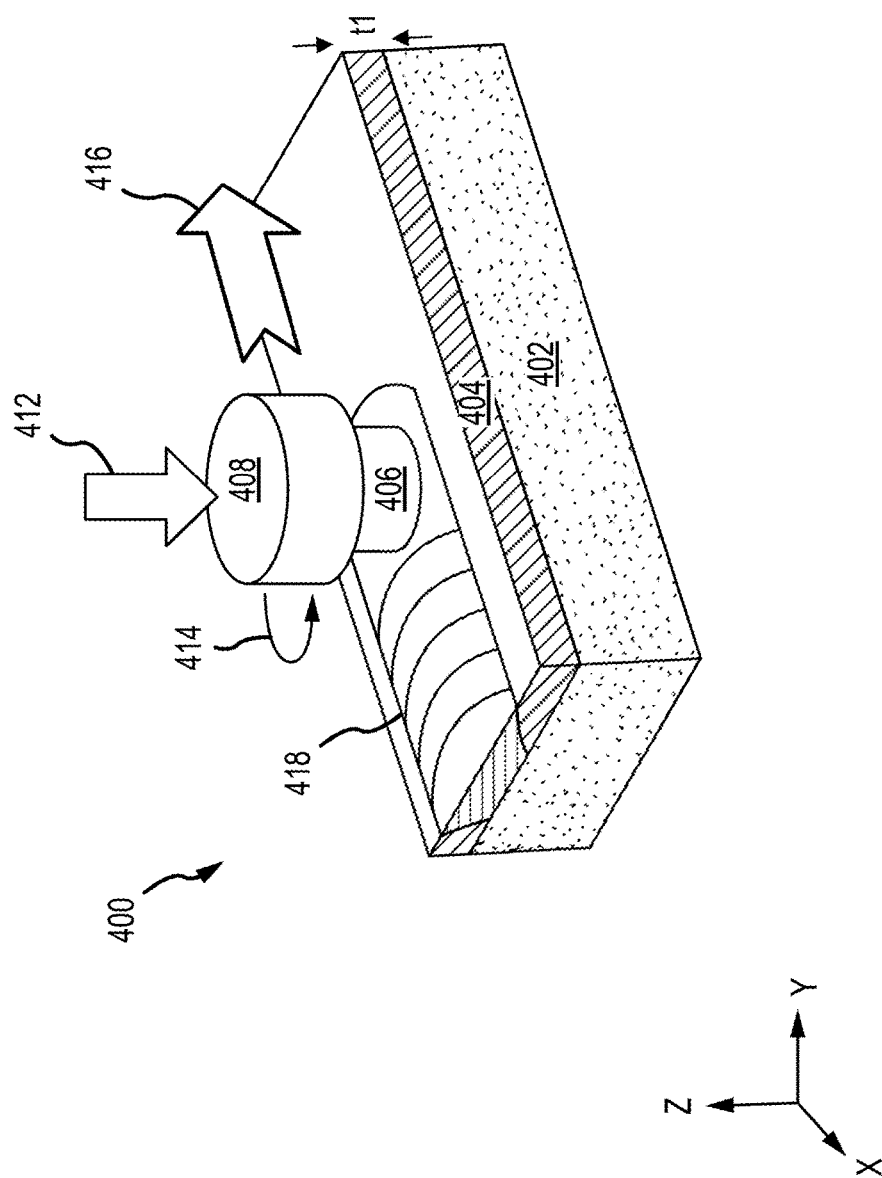
FIGS. 4A, 4B, 4C, and 4D illustrate a method of forming a coating over a workpiece using a sacrificial deposition rod, in accordance with various embodiments.

FIG. 4A illustrates a first step of process 400 where a workpiece 402 receives first coating layer 404. Workpiece 402 may be made from a first type of metal. In various embodiments, the first type of metal may be steel or Al, among other, or any alloy of metal. First coating layer 404 may be made from the same metal as workpiece 402 or a different type of metal. In various embodiments, first coating layer 404 may be more active than workpiece 402. As used herein, more active may define electrochemical behavior and/or corrosion rate of first coating layer 404 as compared to workpiece 402. A chuck 408, also referred to as a shoulder, is receives and supports a sacrificial deposition rod 406. Sacrificial deposition rod 406 may be an example of sacrificial deposition rod 306 described above with respect to FIG. 3. In various embodiments, sacrificial deposition rod 406 may be made from I-phase Al alloy.

Chuck 408 provides an axial force 412 (e.g., in the negative z-direction) on sacrificial deposition rod 406. Axial force 412 on sacrificial deposition rod 406 creates friction between sacrificial deposition rod 406 and workpiece 402. Chuck 408 additional provides a rotation force 414 (e.g., in the counterclockwise direction) on sacrificial deposition rod 406. In various embodiments, rotation force 414 may be in the clockwise direction. Rotation force 414 provides additional friction between sacrificial deposition rod 406 and workpiece 402. The friction between sacrificial deposition rod 406 and workpiece 402 softens sacrificial deposition rod 406 so that a portion of the material of sacrificial deposition rod 406 coats workpiece 402. Chuck 408 applies a radial force 416 in a radial direction (e.g., in the y-direction) to sacrificial deposition rod 406. Coating layer 418 indicates a layer of material deposited on workpiece 402 during a pass in the radial direction. Radial force 416 determines a speed at which sacrificial deposition rod 406 passes over workpiece 402 and a first thickness t1 of first coating layer 404.

Figure 4B:
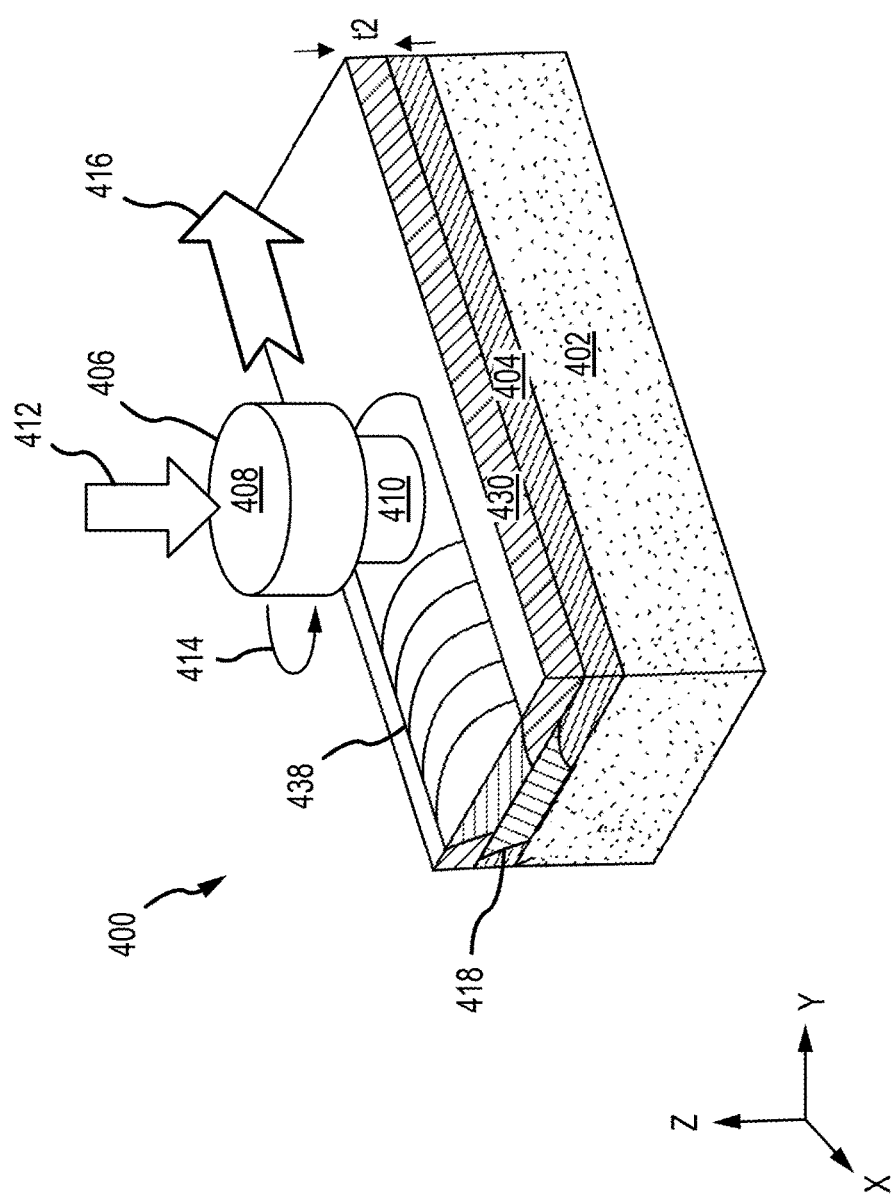

Referring now to FIG. 4B, process 400 may continue by depositing a second coating layer 430 on first coating layer 404. Second coating layer 430 is deposited by the same process as first coating layer 404. Second coating layer 430 has a second thickness t2. In various embodiments, second thickness t2 may be the same as first thickness t1. In various embodiments, second thickness t2 may be greater than or less than first thickness t1. Coating layer 438 indicates a layer of material deposited on first coating layer 404 during a pass in the radial direction.

Figure 4C:
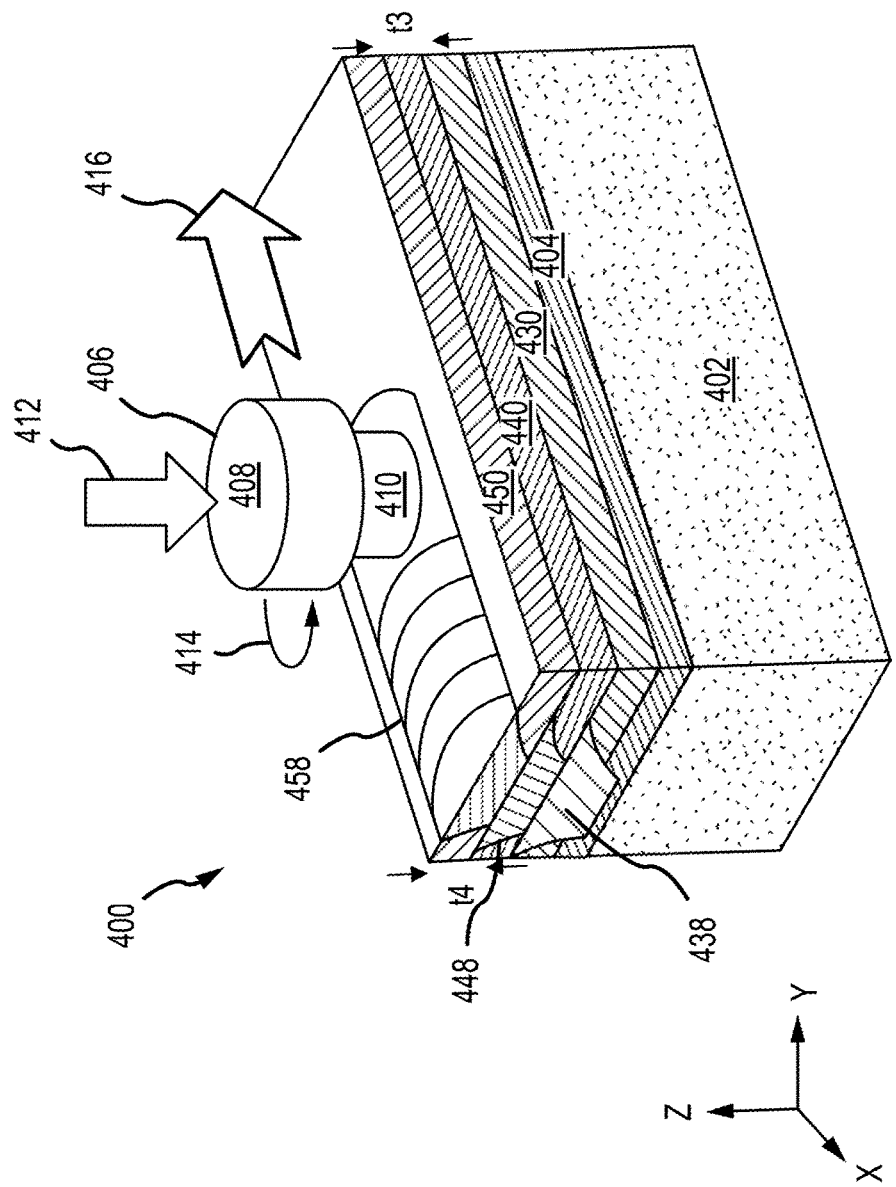

Referring now to FIG. 4C, process 400 may continue by depositing a third coating layer 440 on second coating layer 430 and may deposit a fourth coating layer 450 on third coating layer 440. Third coating layer 440 and fourth coating layer 450 are deposited by the same process as first coating layer 404 and second coating layer 430. Third coating layer 440 has a third thickness t3 and fourth coating layer 450 has a fourth thickness t4. In various embodiments, third thickness t3 and fourth thickness t4 may be the same as first thickness t1 and second thickness t2. In various embodiments, each of first thickness t1, second thickness t2, third thickness t3, and fourth thickness t4 may be the different than each of the other thicknesses t1, t2, t3, t4. Coating layer 448 indicates a layer of material deposited on second coating layer 430 during a pass in the radial direction. Coating layer 458 indicates a layer of material deposited on third coating layer 440 during a pass in the radial direction.

Figure 4D:
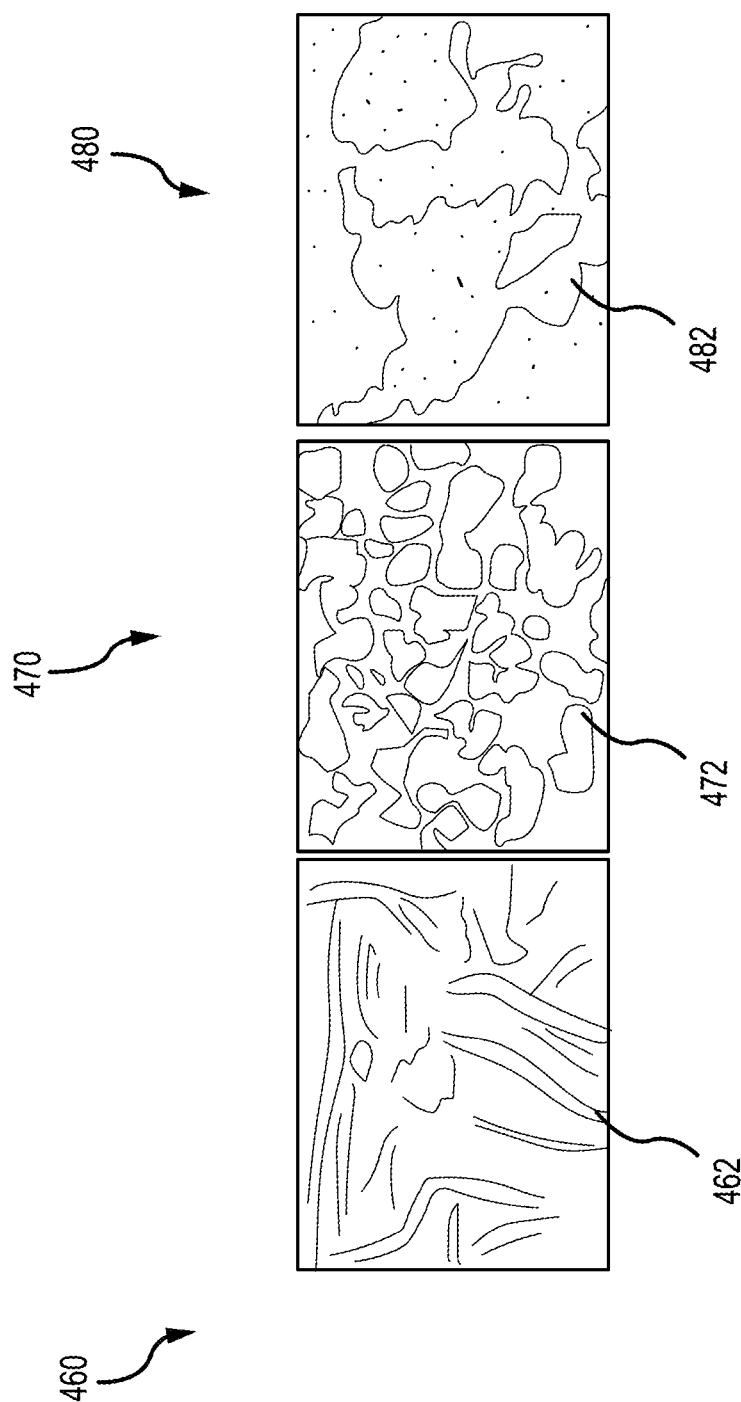

Referring now to FIG. 4D, a first deposition grain 460, a second deposition grain 470, and a third deposition grain 480 are illustrated, in accordance with various embodiments. First deposition grain 460 has a first grain type 462. Second deposition grain 470 has a second grain type 472. Third deposition grain 480 has a third grain type 482. The different grain types 462, 472, and 482 may be achieved by varying the working parameters of the milling machine, as discussed above with respect to FIG. 3. Different material grain types provide different benefits for different coatings. In various embodiments, each layer of deposition may have a different grain type.

Figure 5:
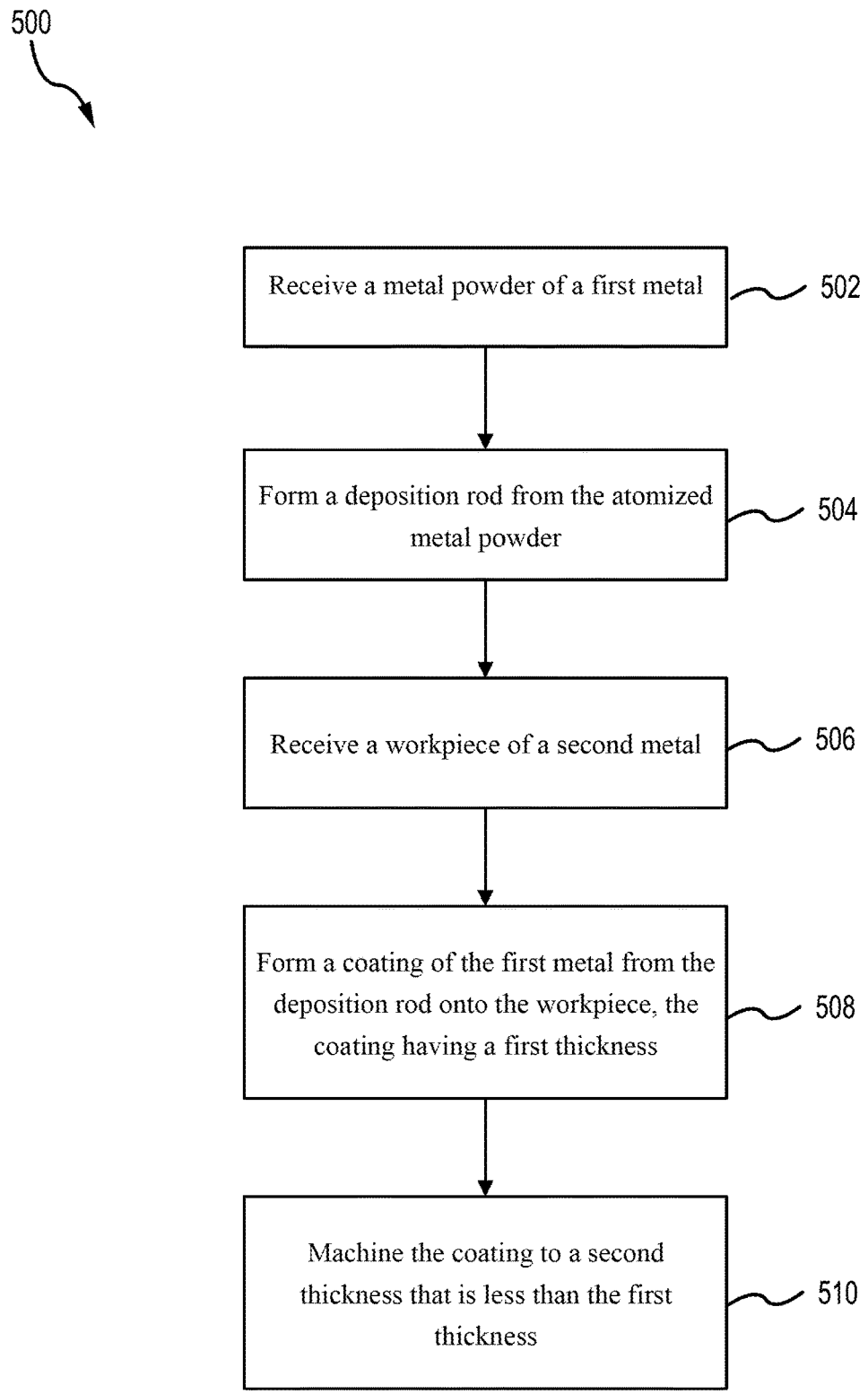
FIG. 5 illustrates a flow diagram of a method of coating a metal workpiece, in accordance with various embodiments.

Referring now to FIG. 5, a flow diagram of a method 500 for coating a workpiece is illustrated in accordance with various embodiments. At block 502, an operator receives a metal powder of a first metal. At block 504, the operator forms a sacrificial deposition rod from the atomized metal powder. At block 506, the operator receives a workpiece of a second metal. At block 508, the operator forms a coating of the first metal from the sacrificial deposition rod onto the workpiece, the coating having a first thickness. At block 510, the operator machines the coating to a second thickness that is less than the first thickness.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
    receiving a workpiece of a second material;
    contacting the workpiece with a sacrificial deposition rod, the sacrificial deposition rod comprising a first material fabricated using a shear assisted processing and extrusion process, wherein the first material includes an icosahedral phase (I-phase) aluminum alloy;
    performing a first deposition process to form a first layer of a coating of the first material on the workpiece, the first deposition process including rotating the sacrificial deposition rod at a first rotation per minute to form the first layer to have a first grain type;
    performing a second deposition process to form a second layer of the coating of the first material over the first layer, the second deposition process including rotating the sacrificial deposition rod a second rotation per minute to form the second layer to have a second grain type, wherein the first layer and the second layer have a first thickness; and
    machining the coating to a second thickness that is less than the first thickness, wherein the machining comprises at least one of grinding or sanding;
    wherein the shear assisted processing and extrusion process includes:
        moving a powder comprising an icosahedral phase (I-phase) aluminum alloy into a billet container that is disposed around a mandrel;
        heating the powder in the billet container with a heating element;
        moving the powder from the billet container through spiral grooves in an extruding tube to form a billet; and
        extruding the billet through the extruding tube with the mandrel to form the sacrificial deposition rod.

2. The method of claim 1, wherein the second material is different than the first material.

3. The method of claim 1, wherein the second material is the same as the first material.

4. The method of claim 1, wherein the first layer is formed to a third thickness and the second layer is formed to a fourth thickness.

5. The method of claim 4, wherein the third thickness is different from the fourth thickness.

6. The method of claim 5, wherein the third thickness is achieved by adjusting a working parameter of the first deposition process with respect to the second deposition process.

7. The method of claim 6, wherein the working parameter is the first rotation per minute.

8. The method of claim 6, wherein the working parameter is an axial speed of the deposition rod.

9. The method of claim 6, wherein the working parameter is an axial force of the deposition rod.

10. The method of claim 6, wherein the working parameter is a radial speed of the deposition rod.

11. The method of claim 1, wherein the first deposition process is a friction surface additive manufacturing process.

12. The method of claim 1, wherein the forming the coating further comprises:
    placing the workpiece in a milling machine;
    setting the sacrificial deposition rod in a chuck of the milling machine; and
    modifying the milling machine to:
        spin the deposition rod at the first rotation per minute;
        feed the deposition rod in an axial direction at a first speed; and
        feed the deposition rod in a radial direction at a second speed.

* * * * *